(12) United States Patent
Miyazaki et al.

(10) Patent No.: US 6,339,411 B2
(45) Date of Patent: *Jan. 15, 2002

(54) DISPLAY DEVICE

(75) Inventors: Kazumasa Miyazaki, Tokyo; Masami Toriduka, Kanagawa; Yoshiki Shirochi, Chiba; Takao Takahashi; Keiichi Nito, both of Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,836

(22) Filed: Jun. 24, 1998

(30) Foreign Application Priority Data

Jun. 27, 1997 (JP) ............................................... 9-171578

(51) Int. Cl.[7] .................................................. G09G 5/00
(52) U.S. Cl. ......................... 345/1.1; 345/2.1; 345/3.1; 345/87; 345/88; 345/98; 345/100; 345/102
(58) Field of Search .............................. 345/1, 2, 3, 88, 345/87, 98, 100, 102, 1.1, 2.1, 3.1

(56) References Cited

U.S. PATENT DOCUMENTS

| | | | | |
|---|---|---|---|---|
| 5,337,068 A | * | 8/1994 | Stewart et al. | 345/88 |
| 5,365,284 A | * | 11/1994 | Marsumoto et al. | 348/793 |
| 5,428,366 A | * | 6/1995 | Eichenlaub | 345/102 |
| 5,796,378 A | * | 8/1998 | Yoshida et al. | 345/88 |
| 5,880,798 A | * | 3/1999 | Walton et al. | 349/99 |
| 5,896,119 A | * | 4/1999 | Evanicky et al. | 345/87 |
| 6,064,358 A | * | 5/2000 | Kitajima et al. | 345/88 |

* cited by examiner

*Primary Examiner*—Richard Hjerpe
*Assistant Examiner*—Jean Lesperance
(74) *Attorney, Agent, or Firm*—Jay H. Maioli

(57) ABSTRACT

A display device has a line scan driving circuit disposed in a horizontal direction of a display region and a pixel driving circuit (dot scan driving circuit) disposed in a vertical direction of the display for performing image display with pixel groups each forming one line in the vertical direction being scanned in the horizontal direction. Vertical-horizontal converting circuitry is provided for converting an image data stream supplied with n pixels in a horizontal direction and m horizontal lines in a vertical scanning direction into an image data stream with m pixels in a vertical direction and n vertical lines in a horizontal scanning direction, and the vertical-horizontal converted data is supplied to the display device by a display controlling circuit. That is, image data is supplied to the displaying device as a vertical-horizontal converted data stream and display operation is executed by vertical pixel rows being scanned in the horizontal direction, as a result of which the relatively small line scan driving circuit is disposed above or below the display region instead of the relatively large dot scan driving circuit and thus the area required for circuit mounting above/below the display region is reduced and the size of the display device in the vertical direction can be effectively reduced.

14 Claims, 13 Drawing Sheets

FRONT-REAR DIRECTION OF HEAD-MOUNTED DISPLAY

SMALLER →

FRONT-REAR DIRECTION OF HEAD-MOUNTED DISPLAY

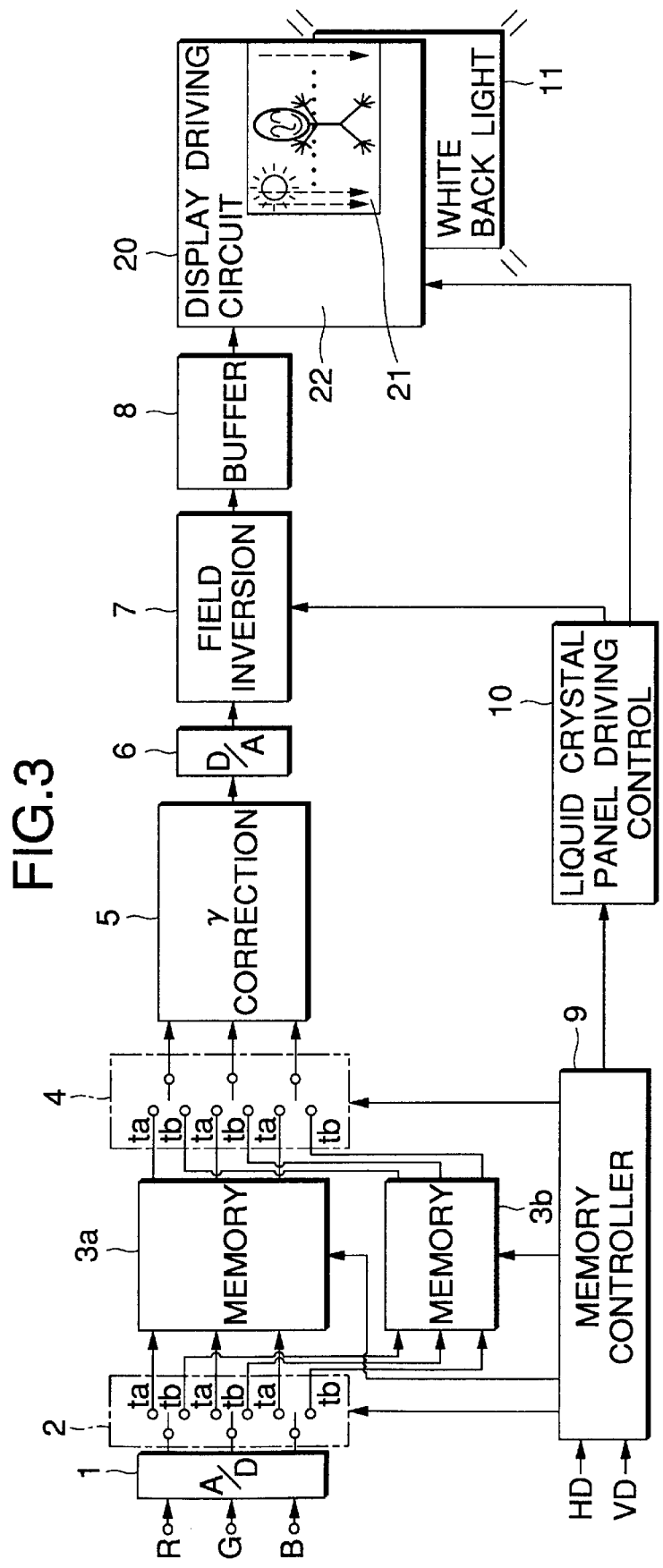

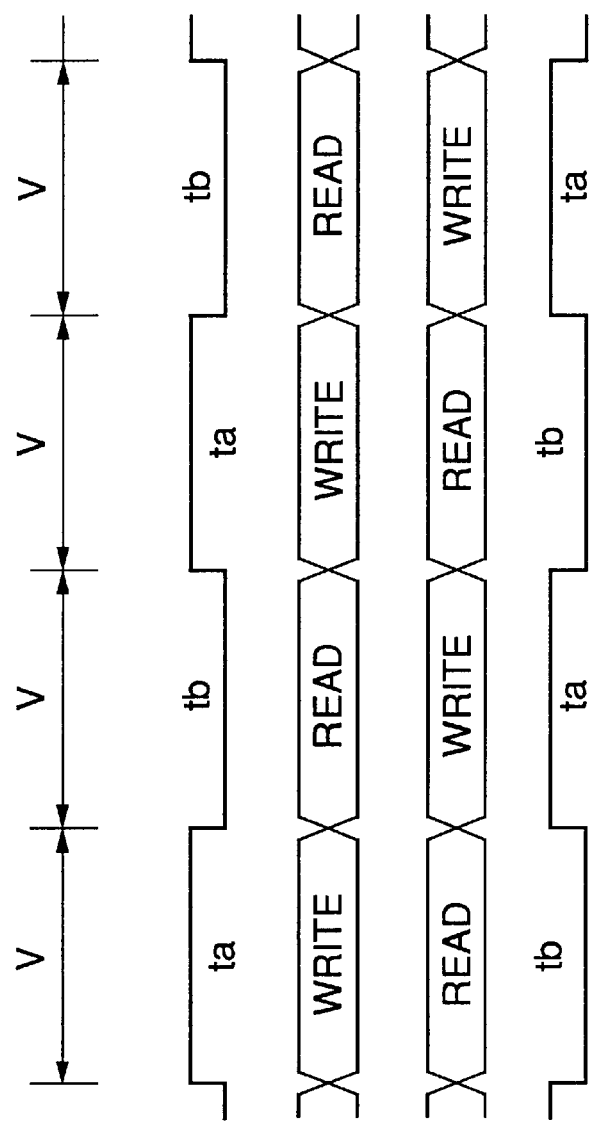

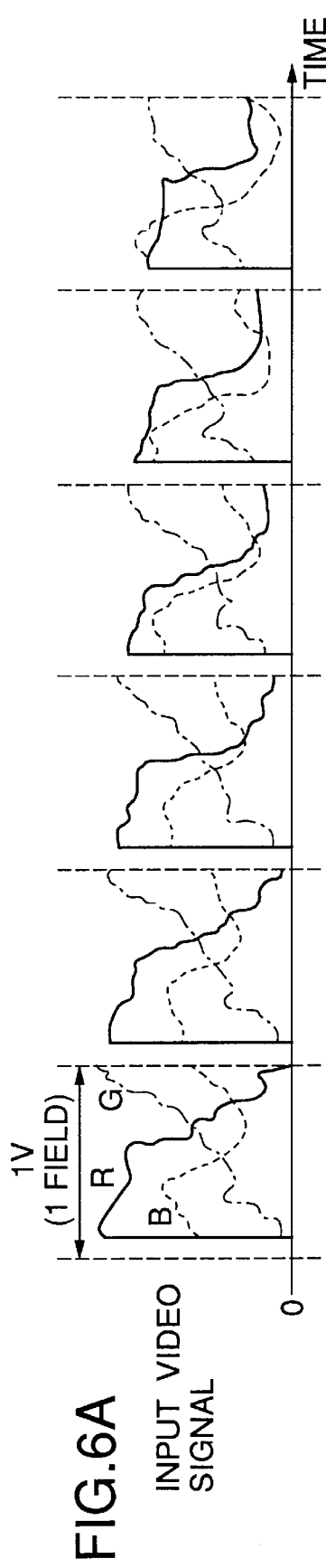
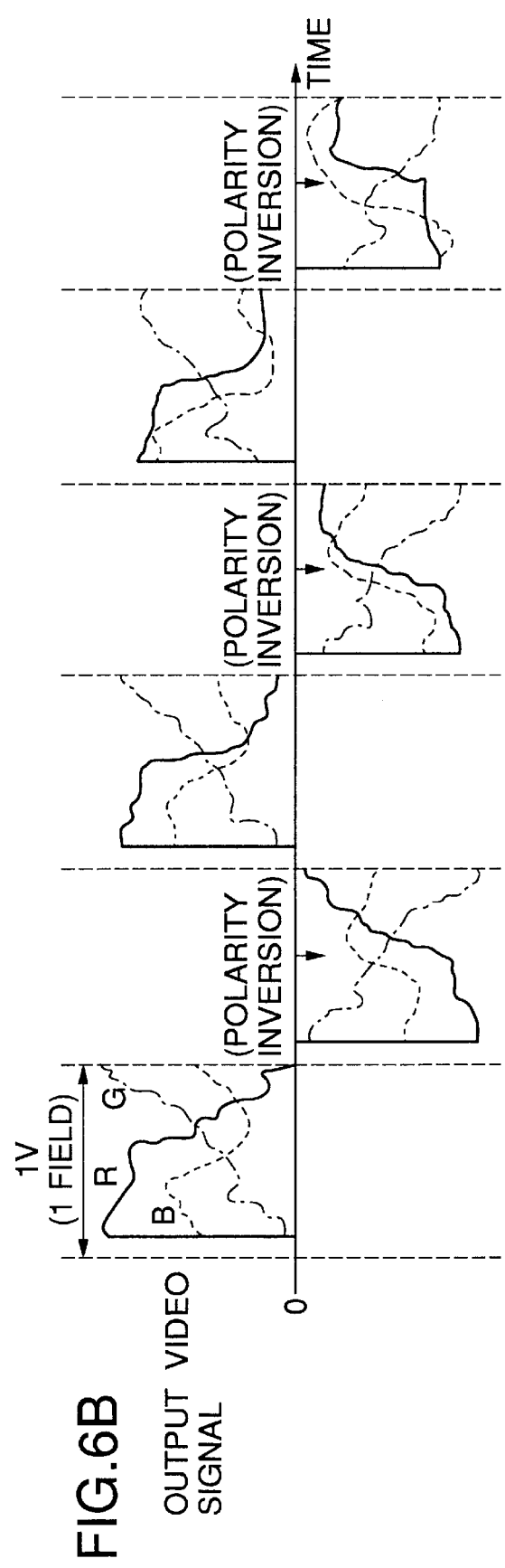

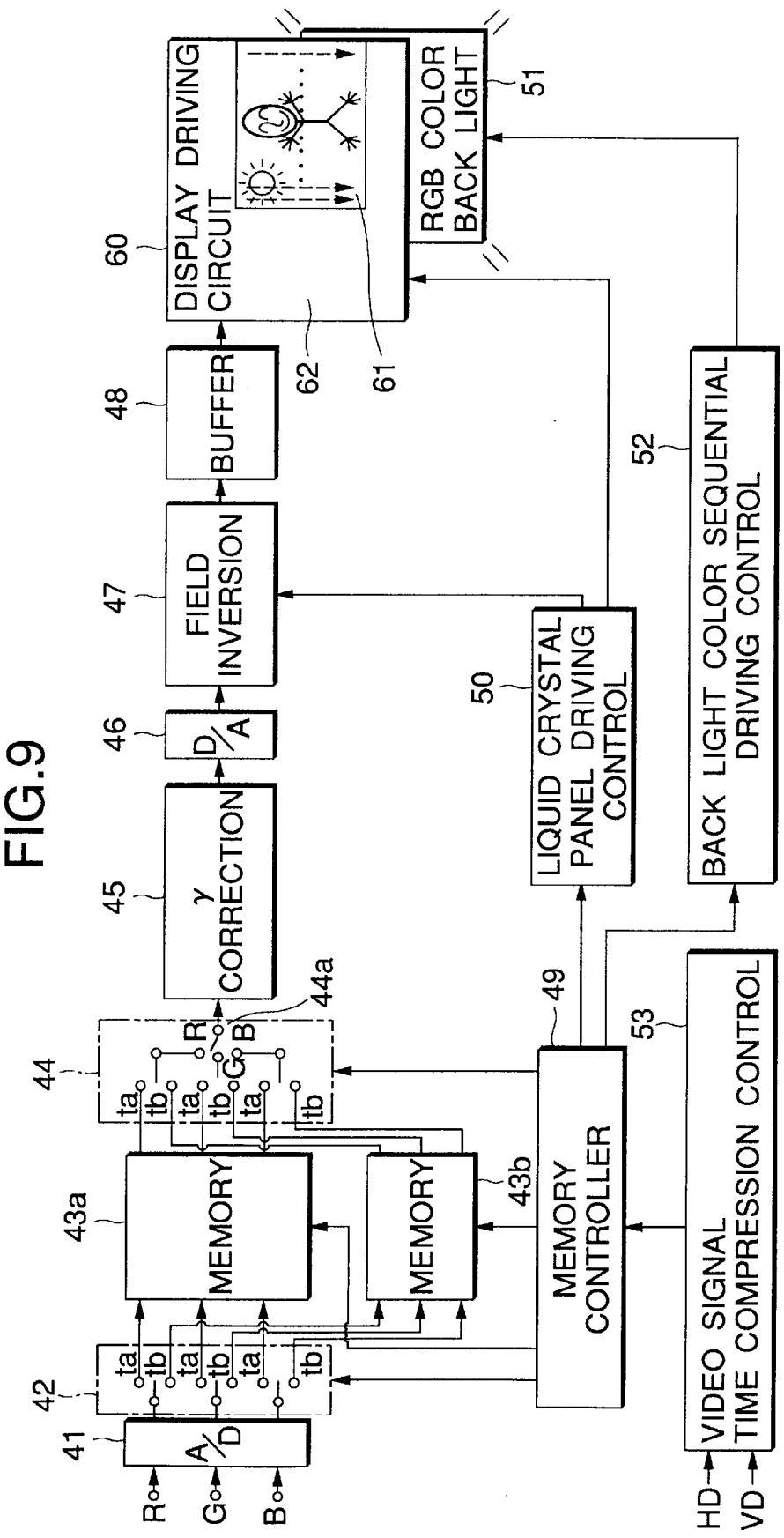

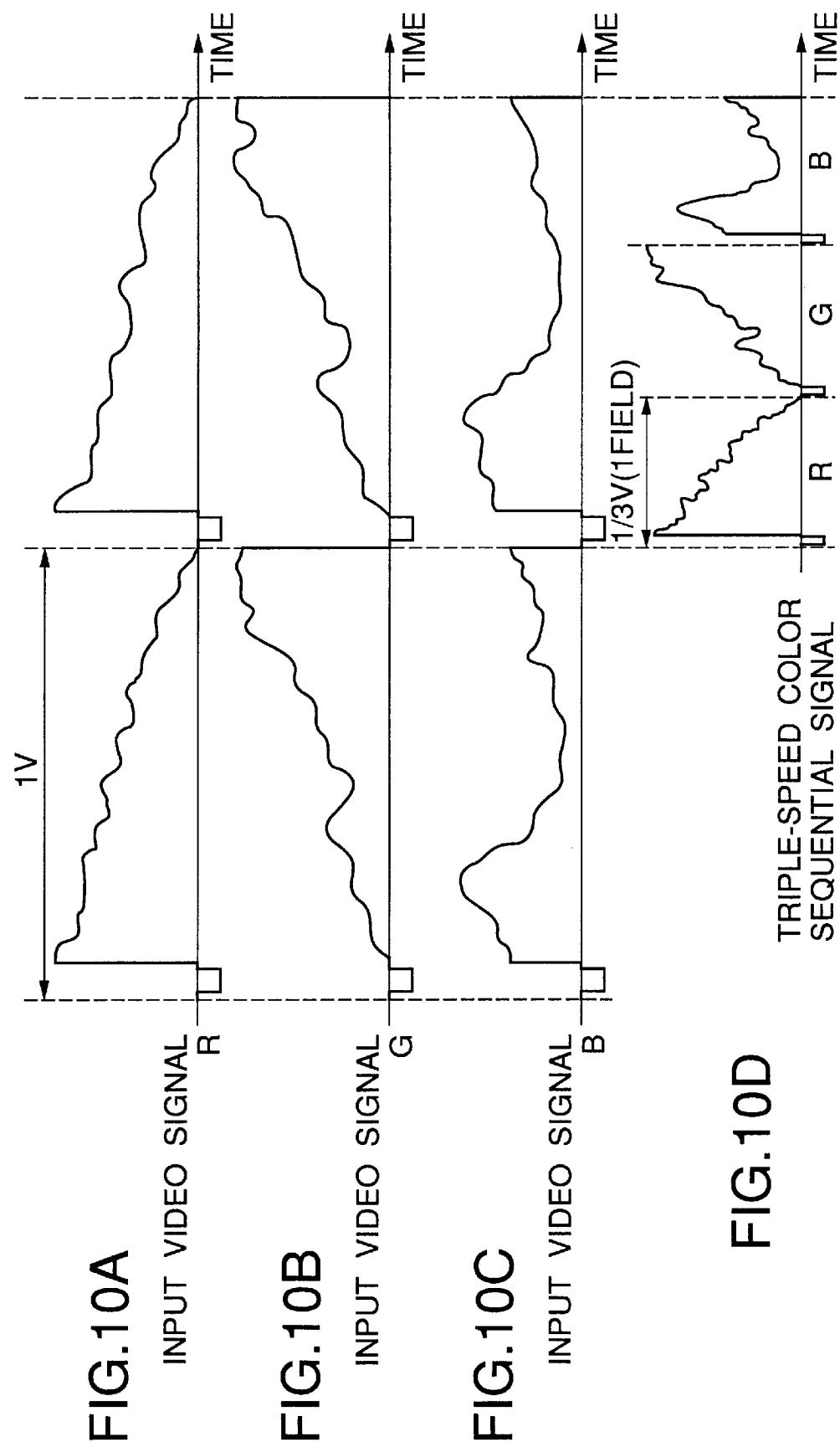

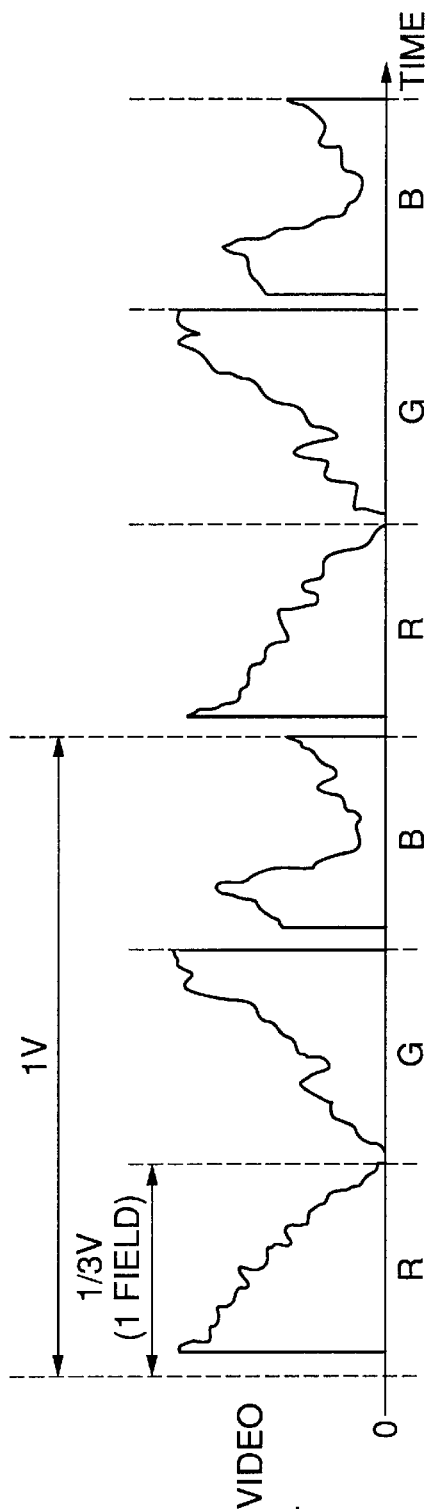
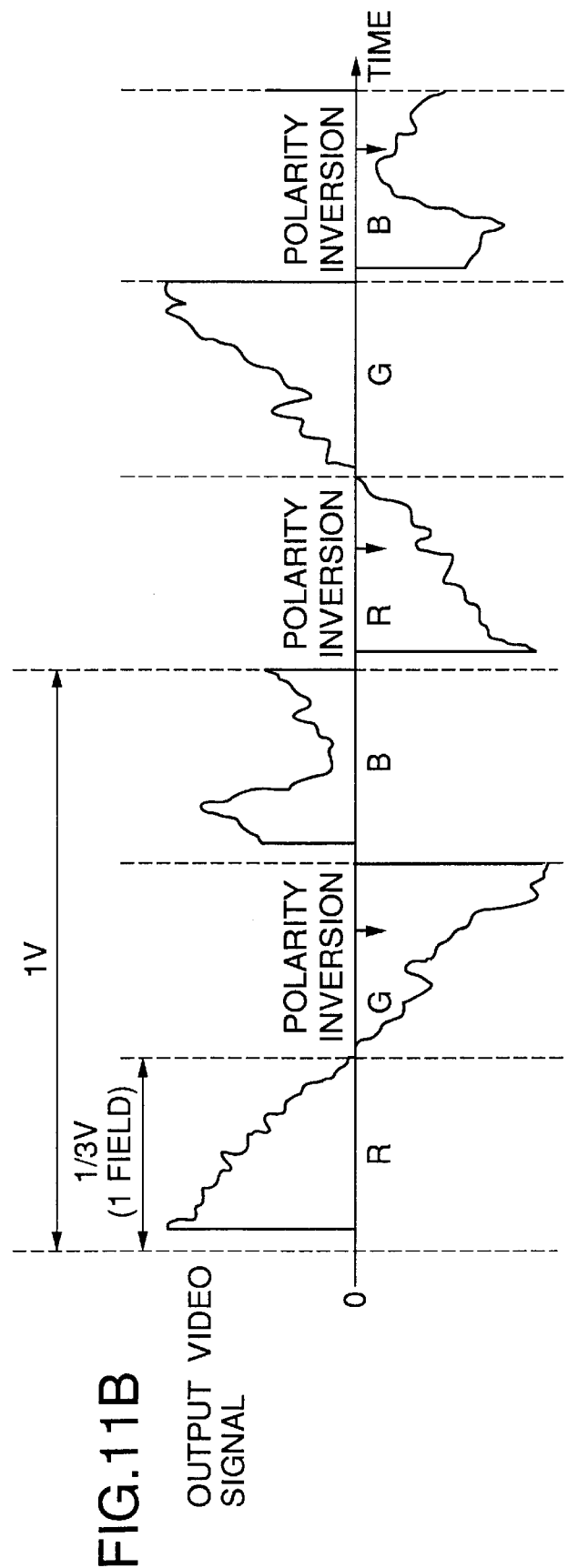
FIG.11A INPUT VIDEO SIGNAL
FIG.11B OUTPUT VIDEO SIGNAL

DISPLAY DEVICE

DESCRIPTION OF THE RELATED ART

Head-mounted displays comprising display devices such as small liquid crystal display panels disposed inside a casing having the form of a pair of spectacles have been developed, and by wearing one of these head-mounted displays a user can enjoy virtual large-screen video. An example of a known optical system of a head-mounted display is shown in FIG. 1.

This FIG. 1 schematically shows an optical system from inside a head-mounted display as seen from the left side (from the side of the left ear of a user wearing the head-mounted display like spectacles); the left-right direction in the figure is the front-rear direction of the head-mounted display, which is positioned in front of the eyes of the user. The optical system includes a back light 71 and a liquid crystal panel 80 disposed horizontally at the top of the head-mounted display. The liquid crystal panel 80 has a display region 81 and an area occupied by a display driving circuit 82 for driving this display region 81.

Light of a video picture displayed by the liquid crystal panel 80 is reflected by a half mirror 72 onto a concave half mirror 73, and light reflected and enlarged by this concave half mirror 73 then passes through the half mirror 72 to the eyes of the user. A liquid crystal shutter 74 is disposed in front of the concave half mirror 73, and by switching this liquid crystal shutter 74 between a transparent state and a blocking state with respect to light from outside the user can as desired control between seeing to the outside through the head-mounted display while still wearing the head-mounted display (that is, seeing the scene outside together with the displayed picture) or seeing only the displayed picture.

SUMMARY OF THE INVENTION

If the display region 81 of the liquid crystal panel 80 has n×m pixels in the horizontal and vertical directions respectively, a dot scan shift register as a pixel driving circuit for driving n pixels arrayed in the horizontal direction and a line scan shift register for sequentially scanning m lines arrayed in the vertical direction are provided in the display driving circuit 82. FIG. 2B is an enlarged view of a part enclosed by the dashed circle in FIG. 2A and shows parts of the display region 81 and the display driving circuit 82.

If the liquid crystal panel 80 is a color panel then image data for each of the three colors R, G and B are supplied to it, and FIG. 2B shows the construction of a part corresponding to for example R image data in an example wherein as R image data three data are supplied to dot scan shift registers 82b, 82c and 82d in parallel. For example three consecutive data are inputted in parallel for reasons relating to image data transfer speed (dot clock frequency), shift register transfer speed, liquid crystal response speed and resolution and so on. Thus this case of three data parallel input is merely an example, and parallel inputting of four or more data or serial inputting with a single dot scan shift register are also conceivable.

These dot scan shift registers (82b, 82c, 82d) are provided for data of each of the colors R, G and B, and consequently the area of the circuit part occupied by the dot scan shift registers disposed in the horizontal direction above or below the display region 81 is relatively large. Although only R pixels are shown in FIG. 2B as the pixels of the display region 81, G pixels and B pixels are also similarly arrayed (in substantially the same positions) and driven by a dot scan shift register for G pixels and a dot scan shift register for B pixels.

A line scan shift register 82a is disposed as a driving circuit for vertical scanning on the left side or the right side of the display region 81. This line scan shift register 82a is used commonly for all the pixels of the colors R, G and B. That is, the line scan shift register 82a executes scanning wherein it successively activates one line of pixels at a time on the basis of a scanning signal generated from vertical and horizontal synchronizing signals, and the signal lines of these lines (pixel gate lines) are common to all the R, G and B pixels of each line.

The display driving circuit 82 thus made up of the dot scan shift registers 82b through 82d and the line scan shift register 82a necessitates a large area for circuit provision on the dot scan shift register side, i.e. in the vertical direction of the display region. That is, although only one single line scan shift register common to R, G and B is needed, because a dot scan shift register must be provided for each of the colors R, G and B at least three are necessary, and in the case of three data parallel inputting shown in FIG. 2B nine are necessary.

Here, in the head-mounted display described above, considering the need to make the display part positioned in front of the eyes of the user small and light and considering aesthetic design aspects, it is desirable for the head-mounted display to be made small in the front-rear direction.

To make the head-mounted display small in the front-rear direction, as can be seen from FIG. 1 it is necessary to reduce the front-rear direction dimensions of the back light 71 and the liquid crystal panel 80, which are disposed horizontally. However, although reducing the size of the back light 71 is not so difficult, reducing the size of the liquid crystal panel 80 in the front-rear direction (that is, the vertical direction of the screen as seen by the user) is difficult.

This will now be explained with reference to FIG. 2A. As mentioned above, for the dot scan shift registers to be disposed above or below the display region 81, the display driving circuit 82 requires a large area for example above the display region 81, as shown in FIG. 2A. Consequently, even if the size of the display region 81 is reduced as shown in FIG. 2A to reduce the front-rear direction size of the liquid crystal panel 80, because the size of the display driving circuit 82 in the vertical direction does not change, the front-rear direction size of the liquid crystal panel 80 cannot be effectively reduced.

Although it is conceivable to dispose the dot scan shift registers in a position on the left or on the right of the display region 81, because in this case the laying of signal lines to the many pixels lined up in the horizontal direction becomes extremely complicated and in the end also necessitates area in the vertical direction, it is not suitable means for solving the problem.

Thus because of the difficulty of reducing the size of the liquid crystal panel 80 in the vertical direction there has been the problem that it is not possible to realize size reduction of a head-mounted display in the front-rear direction.

It is therefore an object of the present invention to provide a display device with which it is possible to effectively realize size reduction in the vertical direction.

To achieve this and other objects, according to a first provision of the invention a display device comprises displaying means for, by having a line scan driving circuit disposed with respect to pixel rows of a horizontal direction of a display region and a pixel driving circuit (dot scan driving circuit) disposed with respect to pixel rows of a vertical direction of the display region, performing image display with pixel groups each forming one line in the vertical direction being scanned in the horizontal direction, vertical-horizontal converting means for converting an image data stream supplied presupposing n pixels in a horizontal direction and m horizontal lines in a vertical scanning direction into an image data stream for m pixels in a vertical direction and n vertical lines in a horizontal scanning direction, and display controlling circuit means for executing image display in the display region of the displaying means by carrying out predetermined processing on and supplying to the pixel driving circuit of the displaying means image data outputted from the vertical-horizontal converting means and supplying a horizontal direction scanning signal synchronized with that image data to the line scan driving circuit. That is, image data is supplied to the displaying means as vertical-horizontal converted data streams and a display operation is executed by vertical pixel rows being scanned in the horizontal direction. In this case, because the line scan driving circuit is disposed above or below the display region, the area required for circuit provision above or below the display region is reduced.

In a second provision of the invention, the vertical-horizontal converting means converts RGB color image data streams supplied presupposing n pixels in a horizontal direction and m horizontal lines in a vertical scanning direction into RGB image data streams for m pixels in a vertical direction and n vertical lines in a horizontal scanning direction and outputs these RGB image data streams color-sequentially using time division. Also, the displaying means is a transmitting or reflecting monochrome liquid crystal display panel, and for display operation of this monochrome liquid crystal display panel an RGB color back light or an RGB color front light carries out a light-emitting operation RGB color-sequentially in correspondence with the RGB image data streams color-sequentially outputted from the vertical-horizontal converting means. In this case, color display is possible with displaying means having ⅓ the number of pixels of an RGB color liquid crystal panel. Or, put another way, in a liquid crystal panel of the same size, the number of pixels can effectively be tripled and high resolution thereby achieved.

According to another provision of the invention, by two units of the displaying means being disposed left-right symmetrically and the display controlling means supplying image data and scanning signals to these two displaying means so that they display the same image while mutually inverted in a top-bottom direction and in a left-right direction, it is possible to raise the freedom of configuration design of for example a head-mounted display or the like.

With the first provision of the invention described above, because a data stream obtained by vertical-horizontal converting ordinary image data by means of vertical-horizontal converting means is supplied to the displaying means and the display operation is executed by vertical pixel rows being scanned in the horizontal direction, it becomes natural for the line scan driving circuit to be disposed above or below the display region in the displaying means. In other words, it becomes unnecessary for a pixel driving circuit requiring a large area for circuit provision to be disposed above or below the display region, and as a result there is the effect that it becomes possible to effectively reduce the size of the displaying means in the vertical direction. And when the display device is to be mounted in a head-mounted display, this makes it possible to reduce the size of the head-mounted display in the front-rear direction.

Color display can be realized according to this provision of the invention by the displaying means being made a transmitting or reflecting color liquid crystal display panel and there being provided a white back light or a white front light for display operation of this color liquid crystal display panel.

In the second provision of the invention described above, vertical-horizontal converting means converts RGB color image data streams supplied presupposing n pixels in a horizontal direction and m horizontal lines in a vertical scanning direction into RGB image data streams for m pixels in a vertical direction and n vertical lines in a horizontal scanning direction and outputs these RGB image data streams color-sequentially using time division. Also, the displaying means is a transmitting or reflecting monochrome liquid crystal display panel, and for display operation of this monochrome liquid crystal display panel an RGB color back light or an RGB color front light carries out a lighting operation RGB color-sequentially in correspondence with the RGB image data streams color-sequentially outputted from the vertical-horizontal converting means. In this case, displaying means having the same resolution as an RGB color liquid crystal display panel can have ⅓ of the pixels, and there is the effect that it is possible to realize simplification of the circuit construction and accompanying reduction in size of the displaying means. Or, considering displaying means the same size (having the same total number of pixels) as an RGB color liquid crystal display panel, because effectively the number of pixels is tripled, there is the effect that high resolution can be achieved.

When according to the other provision of the invention mentioned above two units of the displaying means are disposed left-right symmetrically and the display controlling means supplies image data and scanning signals to these two displaying means so that they display the same image while mutually inverted in a top-bottom direction and in a left-right direction, there is the effect that it is possible to raise the freedom of configuration design of for example a head-mounted display or the like.

BRIEF DESCRIPTION OF THE DRAWINGS

FIG. 3 is a block diagram of a display device of a first preferred embodiment of the invention;

FIGS. 4A through 4D are views illustrating a memory operation of the same display device;

FIGS. 6A and 6B are views illustrating field inversion in the first preferred embodiment;

FIG. 9 is a block diagram of a display device of a second preferred embodiment of the invention;

FIGS. 10A through 10D are views illustrating a triple speed color-sequential output of the second preferred embodiment;

FIGS. 11A and 11B are views illustrating field inversion in the second preferred embodiment;

DETAILED DESCRIPTION OF THE PREFERRED EMBODIMENTS

Figure 1:
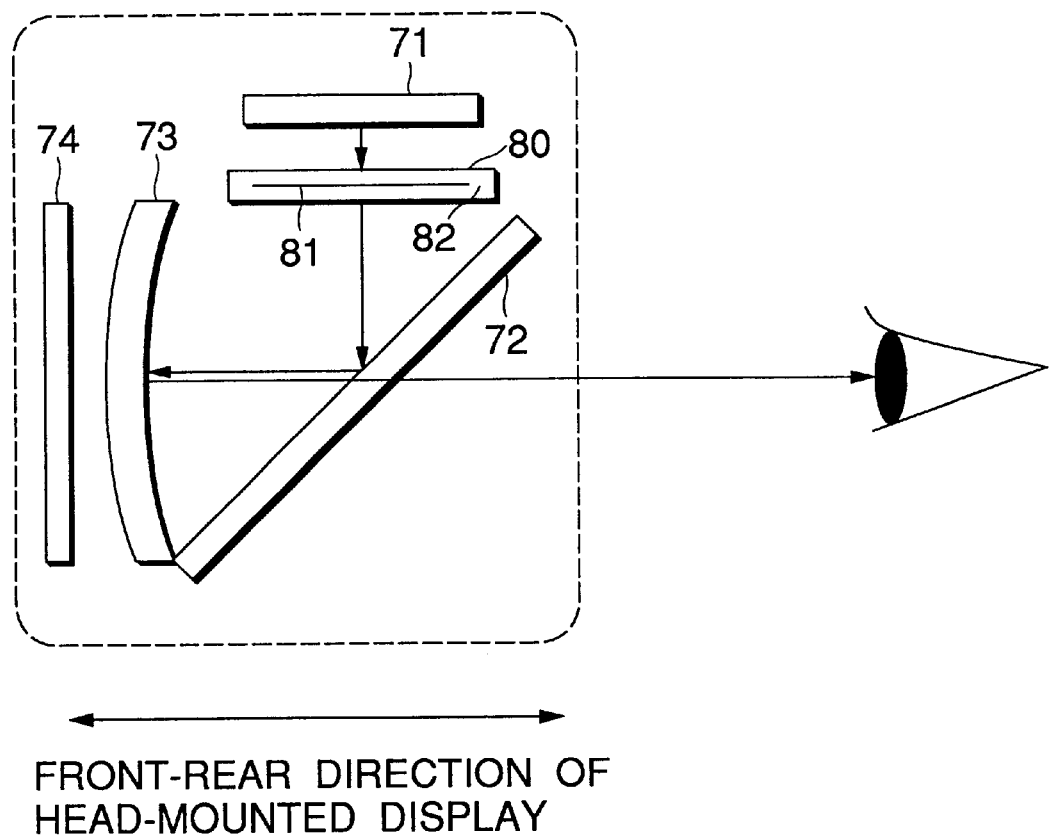
FIG. 1 is a view illustrating an optical system of a head-mounted display.

A first preferred embodiment of a display device according to the invention will now be described with reference to FIG. 3 through FIG. 8C. FIG. 3 is a block diagram of the display device of this first preferred embodiment, and for example one display device having the construction shown in FIG. 3 may be provided for each eye of a user inside a head-mounted display 30 of the kind shown in FIGS. 8A through 8C having the form of a pair of spectacles.

Signals of the three primary colors R, G and B (an R signal, a G signal and a B signal) are supplied as video signals to this display device, and these R, G and B signals are each converted into digital data by an A/D convertor 1.

As will be further discussed later, the display device of this preferred embodiment has the feature that a liquid crystal panel 20 for executing display executes image display of one frame by pixel groups each forming one line in the vertical direction being successively scanned in the horizontal direction. That is, vertical and horizontal are reversed compared to the display operation of an ordinary display device wherein horizontal lines are scanned in the vertical direction. Because the R, G and B signals supplied to the display device are video signals based on ordinary scanning wherein horizontal lines are scanned in the vertical direction, if they were to be used as they are then vertical and horizontal would be displayed inverted on the liquid crystal panel 20 and correct display would not be possible due to the differences in the horizontal and vertical numbers of pixels. For this reason, in this preferred embodiment, switches 2 and 4, memories 3a and 3b, and a memory controller 9 function as a circuit part for vertical-horizontal inverting the video signals to adapt them to the horizontal scanning of the liquid crystal panel 20 of this preferred embodiment.

When the switch 2 is switched to terminals ta, the R, G and B signals outputted from the A/D convertor 1 are severally supplied as write data to the memory 3a, and when the switch 2 is switched to terminals tb the R, G and B signals are supplied as write data to the memory 3b. The stored R, G and B signals are subsequently read from the memory 3a, and when the switch 4 is switched to terminals ta the R, G and B signals read out from this memory 3a are outputted from the switch 4 to a γ correction circuit 5. The R, G and B signals stored in the memory 3b are similarly outputted from the switch 4 to the γ correction circuit 5 when the switch 4 is switched to terminals tb. The memories 3a, 3b each have a capacity such that they can store R, G and B signals of at least one video signal field.

The switching operation of the switches 2, 4 and the writing/reading operation of the memories 3a, 3b are controlled by the memory controller 9. The memory controller 9 generates switching timing for the switches 2, 4 and writing/reading operation timing for the memories 3a, 3b from a horizontal synchronizing signal HD and a vertical synchronizing signal VD and controls the various parts accordingly.

Specifically, the timing of the switching operation of the switches 2, 4 and the writing/reading operation of the memories 3a, 3b implemented by the control of the memory controller 9 is as shown in FIGS. 4A through 4D. That is, the control of the memory controller 9 switches the operations every one field period (shown by 'V') and executes writing and reading of one field unit to and from the memories 3a, 3b alternately.

First, in a certain field period the switch 2 is switched to the terminals ta and writing to the memory 3a is executed. Thus R, G and B signals of that field period are written to the memory 3a. At this time, R, G and B signals of the immediately preceding field period have been written to the memory 3b. Therefore, when writing to the memory 3a starts, data of the immediately preceding field is stored in the memory 3b. Accordingly, simultaneously with the start of the writing of data of a certain field to the memory 3a, the memory controller 9 starts the reading of data of the immediately preceding field from the memory 3b. Also, simultaneously with this the memory controller 9 switches the switch 4 to the terminals tb and thereby supplies the data read out from the memory 3b to the next circuit part. In the next field period, reversely, the memory controller 9 switches the switch 2 to the terminals tb and commands writing to the memory 3b. Thus data of that field period is written to the memory 3b. At the same time, the memory controller 9 commands reading from the memory 3a and switches the switch 4 to the terminals ta and thereby supplies the data of the immediately preceding field as of that time to the next circuit part.

By writing/reading being carried out alternately by the memories 3a, 3b in this way, the data of all fields is supplied to the circuit parts from the γ correction circuit 5 onward delayed by one field period; however, by the writing order and the reading order in which the image data of each field is written to and read from the memories 3a, 3b being made different, the data stream constituting the image data of each field is vertical-horizontal inverted. This operation will be explained in FIG. 5.

Figure 5A:
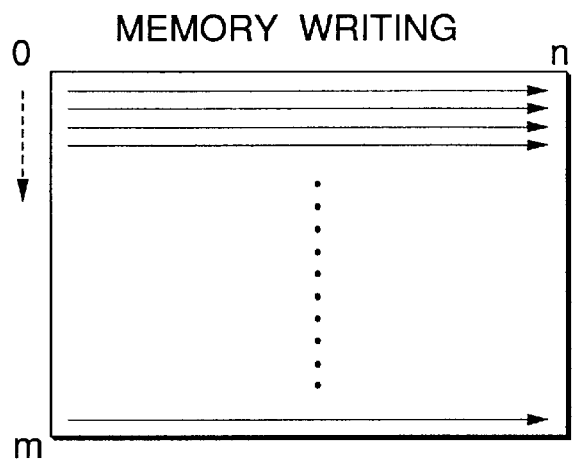
FIGS. 5A through 5C are views illustrating a vertical-horizontal converting operation carried out by memories in the same display device.
Figure 5B:
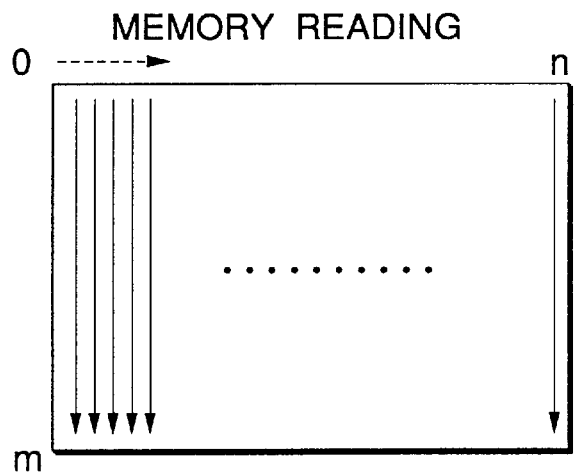
Figure 5C:
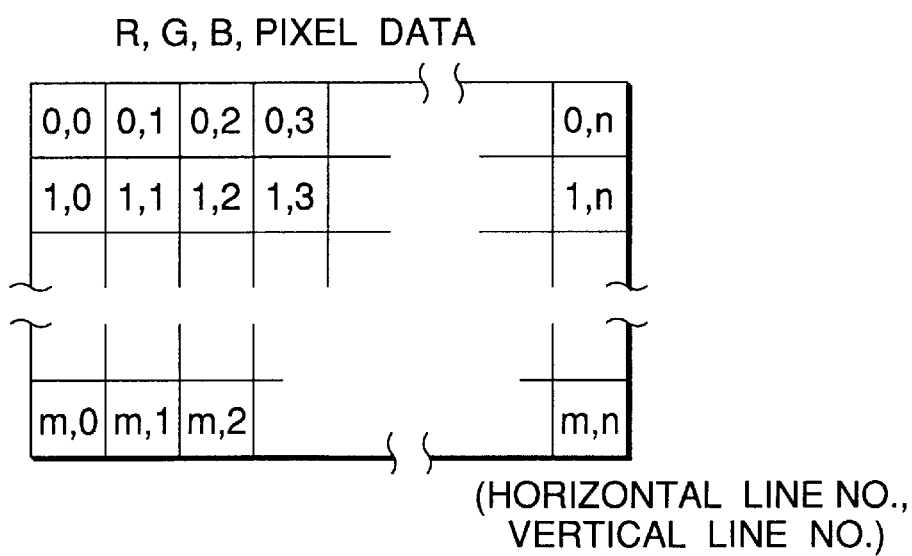

Now, it will be assumed that each of R, G and B signals constituting video data of one field period outputted from the A/D convertor 1 is made up of the numbers of pixels shown in FIG. 5C. That is, n pixels in the horizontal direction and m pixels in the vertical direction. Seen as a data stream inputted into one of the memories 3a, 3b, the pixel data is written into the memory 3a or 3b in the order (0, 0) (0, 1), (0, 2) . . . (0, n) (1, 0) (1, 1) . . . (1, n) (2, 0) (2, 1) . . . (2, n) . . . (m, 0) (m, 1) . . . (m, n) in accordance with ordinary display scanning wherein horizontal lines are scanned in the vertical direction. In correspondence with this the memories 3a, 3b each have an address space of size n×m corresponding to one field of image data, as shown in FIG. 5A, and for each supplied data stream of one field in size the writing of the data is carried out as shown by the arrows in an address direction corresponding to ordinary display scanning wherein horizontal lines are scanned in the vertical direction. In this way the image data of one field is held unchanged in the memory 3a or 3b.

At the time of the operation of reading from the memories 3a, 3b, on the other hand, the data reading is carried out in an address direction corresponding to display scanning which is the reverse of usual and in which vertical lines are scanned in the horizontal direction, as shown by arrows in FIG. 5B. As a result, the image data of one field is read from the memory 3a or 3b in the order (0, 0) (1, 0) . . . (m, 0) (0, 1) (1, 1) . . . (m, 1) (0, 2) (1, 2) . . . (m, 2) . . . (0, n) (1, n) . . . (m, n), that is, as a data stream which has been vertical-horizontal inverted. In other words, as the memory controller 9 executes writing/reading with respect to the memories 3a, 3b with the timing shown in FIGS. 4A through 4D, it realizes a vertical-horizontal conversion of the image data by making the writing addresses and the reading addresses it supplies have orders which differ as shown by the arrows in FIGS. 5A and 5B.

These R, G and B signals constituting vertical-horizontal converted image data first undergo γ correction processing in the γ correction circuit 5 according to the V-T characteristic of the liquid crystal panel 20. The γ-corrected R, G and B signals are then severally converted back into analog signals in a D/A convertor 6.

The R, G and B signals outputted from the D/A convertor 6 are converted in a field inverting circuit 7 into video signals having had their polarity inverted every one field (1V). FIG. 6A shows the R, G and B signals outputted from the D/A convertor 6 with solid lines, broken lines and dotted lines respectively, and for example video signals like these are outputted with their polarity inverted every one field as shown in FIG. 6B. The timing of each field is provided by a liquid crystal panel driving circuit part 10. The liquid crystal panel driving circuit part 10 generates timing of one field in accordance with horizontal and vertical timing from the memory controller 9 and generates a signal for scanning and supplies this to the liquid crystal panel 20.

Here, because the R, G and B signals consist of data vertical-horizontal inverted in the memories 3a, 3b as described above, although the period length of one field is the same as the original period length prescribed by the vertical synchronizing signal VD, for scanning in the liquid crystal panel 20 (i.e. scanning of vertical lines in the horizontal direction) the original vertical synchronizing signal VD and horizontal synchronizing signal HD cannot be used as they are. For this reason, the liquid crystal panel driving circuit part 10 generates and supplies to the liquid crystal panel 20 for horizontal direction scanning a vertical line synchronizing signal whose timing is based on the reading operation of the memory controller 9.

The R, G and B signals outputted from the field inverting circuit 7 are supplied through a buffer 8 to the liquid crystal panel 20. The liquid crystal panel 20 is a transmitting RGB trio liquid crystal panel, and has a display region 21 (panel part) and a display driving circuit 22 for driving pixels in the display region 21. A white back light 11 is disposed behind the display region 21 for transmitting display operation.

Figure 7A:
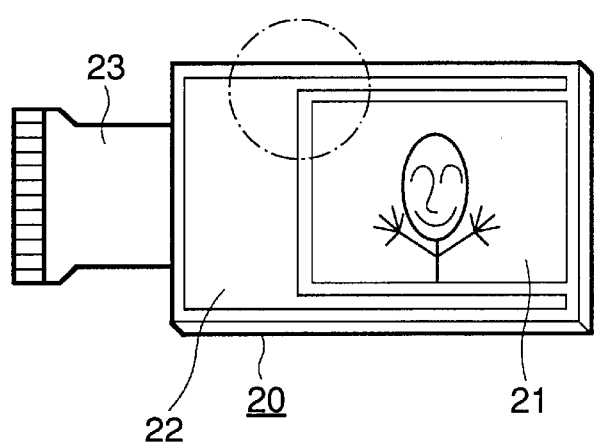
FIGS. 7A and 7B are views illustrating the construction of a liquid crystal panel in the first preferred embodiment.
Figure 7B:
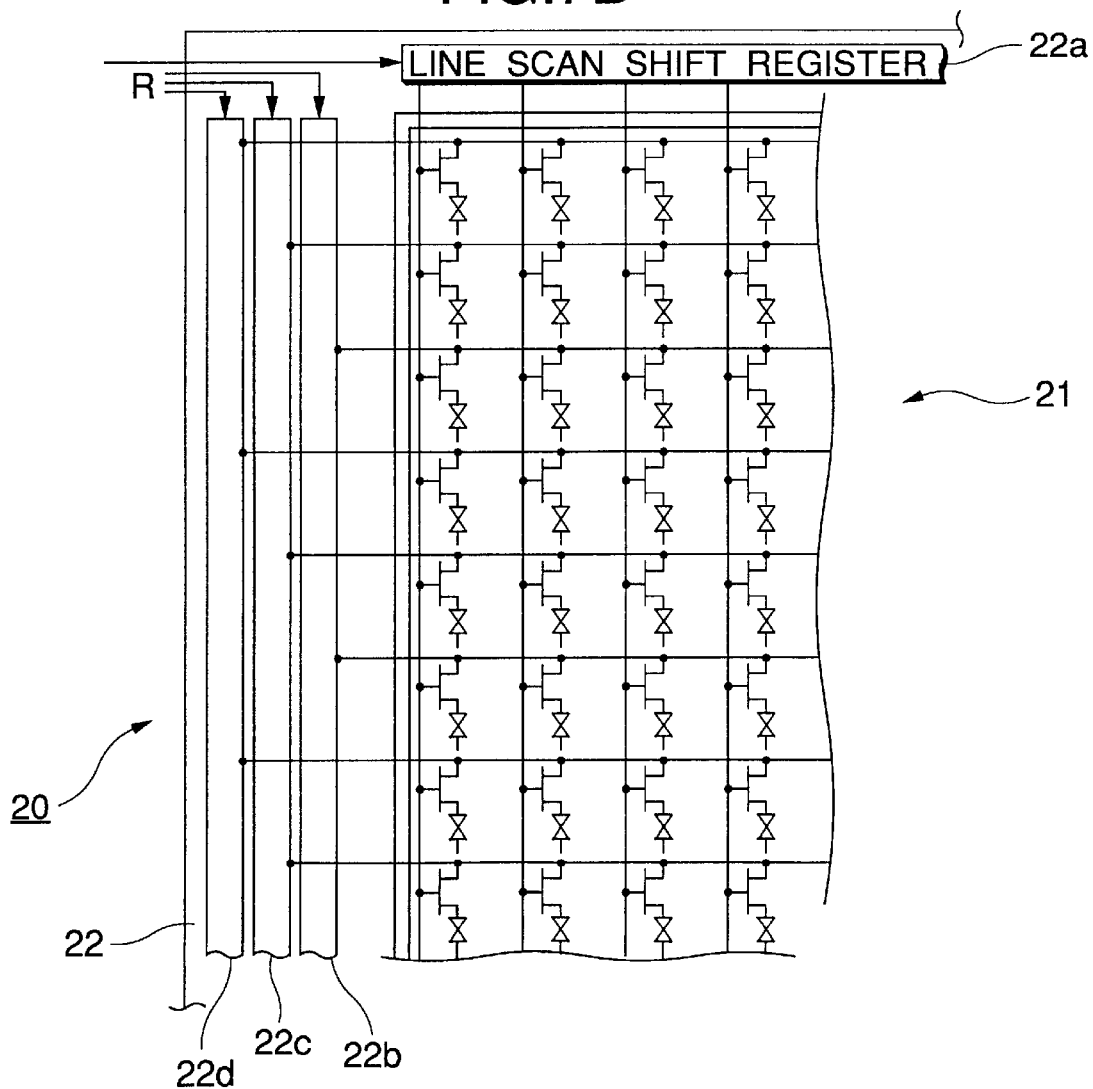

The liquid crystal panel 20 is shown in FIGS. 7A and 7B. As shown in FIG. 7A, in this liquid crystal panel 20 a large-area region is provided for the display driving circuit 22 on the left side of the display region (panel part) 21. As this display driving circuit 22, for example a line scan shift register 22a and dot scan shift registers 22b, 22c, 22d are disposed as shown in FIG. 7B, which is an enlarged view of the circled part in FIG. 7A.

Figure 2A:
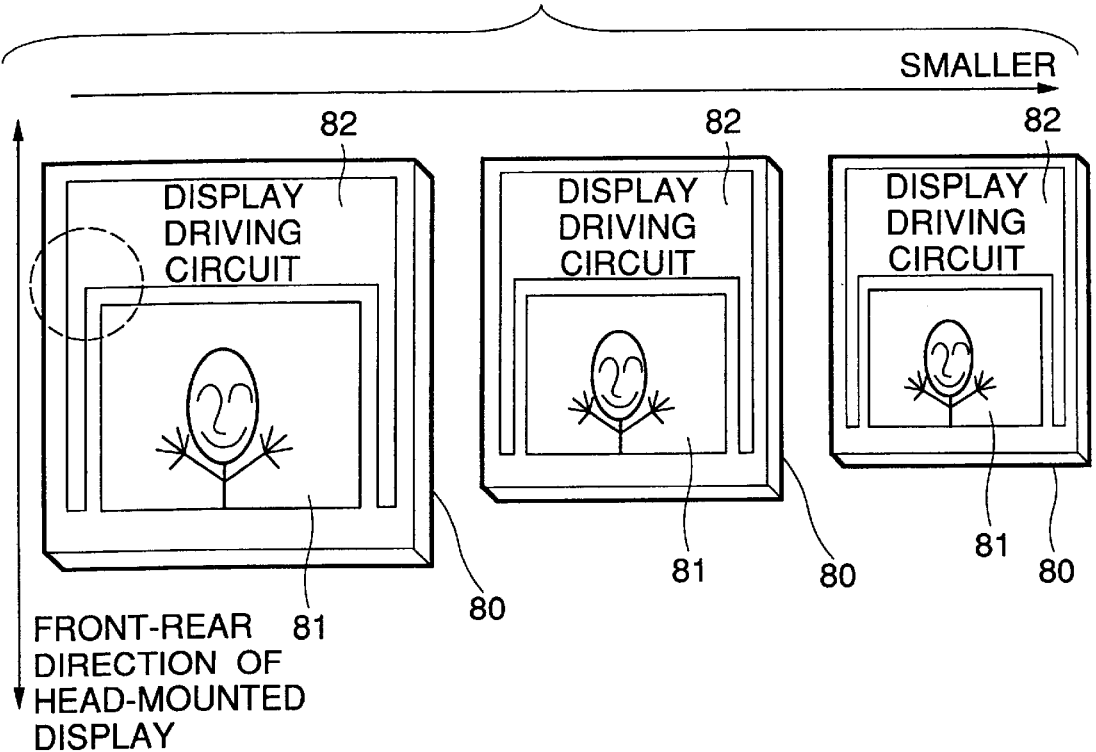
FIGS. 2A and 2B are views illustrating a problem relating to the vertical size of a liquid crystal panel.
Figure 2B:
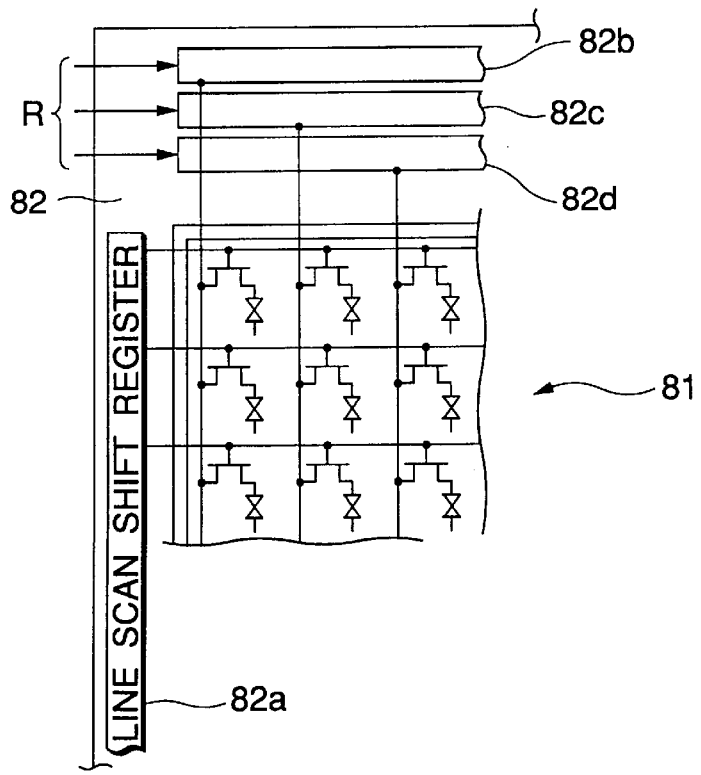

The display region 21 in the transmitting RGB trio liquid crystal panel 20 has n×m pixels in the horizontal and vertical directions respectively for each of the colors R, G and B, but by the display driving circuit 22 being made up of dot scan shift registers 22b, 22c, 22d as a pixel driving circuit for the m pixels of the vertical direction and a line scan shift register 22a for successively scanning the n lines of the horizontal direction it is constructed so that scanning of vertical lines in the horizontal direction is executed. R, G and B image signals are supplied from the buffer 8, and FIG. 7B shows the construction of a part corresponding to the R signal in an example wherein as the R signal three data are supplied to the dot scan shift registers 22b, 22c, 22d in parallel. As mentioned above with reference to FIG. 2B, the reason for three consecutive data being inputted in parallel relates to image data transfer speed (dot clock), shift register transfer speed, liquid crystal response speed and resolution and so on. Thus this case of three data parallel input is merely an example, and parallel inputting of four or more data or serial inputting with a single dot scan shift register are also conceivable.

These dot scan shift registers 22b, 22c, 22d are provided for data of each of the colors R, G and B, and consequently the area of the circuit part made up of dot scan registers disposed vertically in the left part of the liquid crystal panel 20 (or alternatively the right part) becomes relatively large. Also, although only R pixels are shown in FIG. 7B as the pixels of the display region 21, G pixels and B pixels are similarly disposed (in substantially the same positions), and driven by the dot scan shift registers for G pixels and the dot scan shift registers for B pixels.

The line scan shift register 22a is disposed as a driving circuit for horizontal direction scanning on the upper side or the lower side of the display region 21. The line scan shift register 22a is used commonly for the pixels of all three of the colors R, G and B. By the scanning signal generated in the liquid crystal panel driving circuit part 10 in synchrony with the vertical-horizontal inverted video signals being supplied to the line scan shift register 22a, scanning to successively activate gate lines of the pixels one vertical line at a time is executed. Because the signal lines (pixel gate lines) of these lines are common to the pixels of all three of the colors R, G and B in each line, only one line scan shift register 22a needs to be disposed commonly for R, G and B above or below the display region 21, and thus a large area for circuit provision is not needed in the vertical direction.

The three data parallel R signal supplied from the buffer 8 to the dot scan shift registers 22b, 22c, 22d and the three data parallel G signal similarly supplied from the buffer 8 to three dot scan shift registers not shown in the figures and the three data parallel B signal also similarly supplied from the buffer 8 to three dot scan shift registers not shown in the figures, and the horizontal scanning signal supplied to the line scan shift register 22a from the liquid crystal panel driving circuit part 10, are fed from a board on which the circuitry up to the buffer 8 is mounted to a board of the display driving circuit 22 constituting the liquid crystal panel 20 by a lead line pattern formed on a flexible board 23 of the kind shown in FIG. 7A.

In the display device of this preferred embodiment, as described above, video signals vertical-horizontal converted using the memories 3a, 3b are impressed on the liquid crystal panel 20 and dot scan shift registers 22b, 22c, 22d are disposed in the vertical direction on the liquid crystal panel 20 and carry out vertical direction pixel driving on the basis of these video signals. Also, a line scan shift register 22a is disposed on the liquid crystal panel 20 in the horizontal direction, and by a horizontal scanning signal synchronized with the vertical-horizontal converted video signals being generated and supplied to this by the liquid crystal panel driving circuit part 10, scanning of vertical lines is executed in the horizontal direction. As a result, the video picture displayed on the display region 21 is an image in a normal upright state (that is, a normal upright image based on the video signals inputted to the display device), and the display device can for example be employed as a liquid crystal panel in a head-mounted display of the kind described above with reference to FIG. 1 with no problems whatsoever.

Figure 8A:
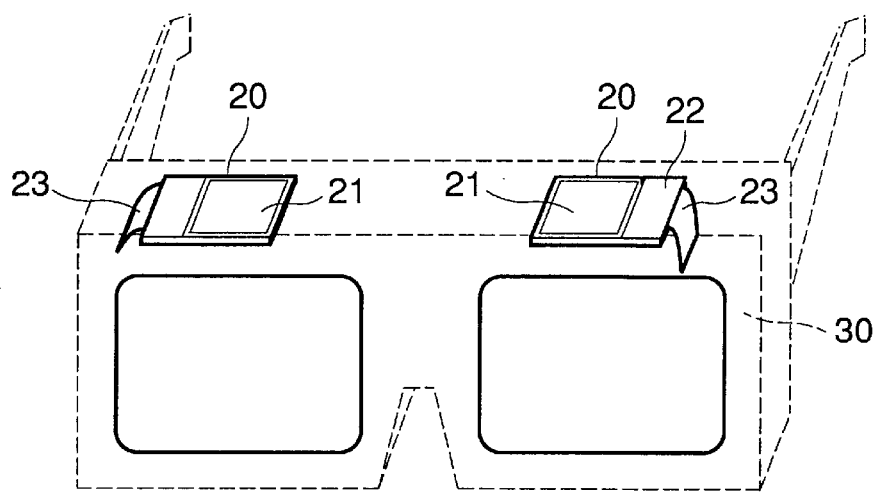
FIGS. 8A through 8C are views illustrating configurations of display devices according to the first preferred embodiment inside a head-mounted display.
Figure 8B:
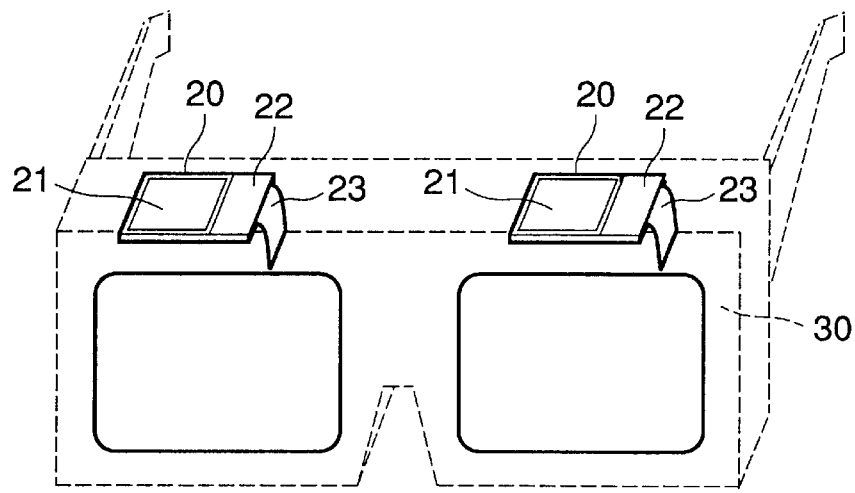
Figure 8C:
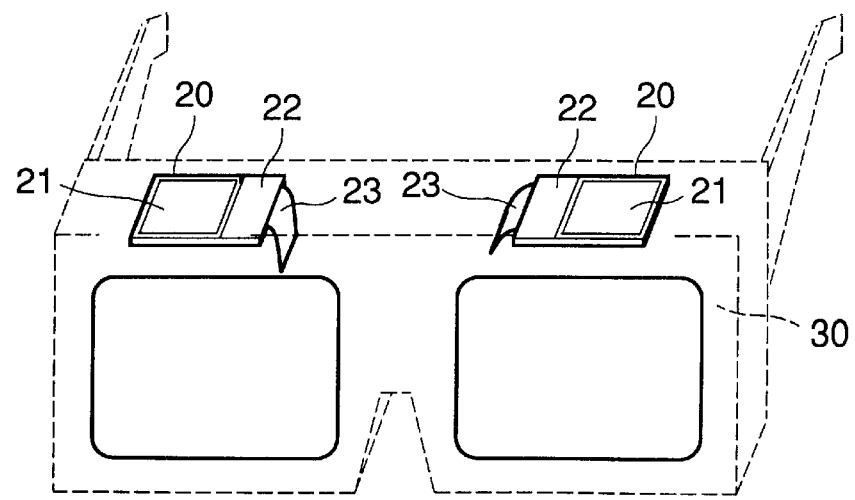

In the case of this preferred embodiment, because the only circuit part needing to be parallel with the horizontal direction is the line scan shift register 22a, it becomes possible for the vertical direction size of the liquid crystal panel 20 to be effectively reduced. Since the vertical direction of the liquid crystal panel 20 corresponds to the front-rear direction of the head-mounted display 30 of FIGS. 8A through 8C, this is helpful in reducing the front-rear direction size of a head-mounted display 30. FIGS. 8A, 8B and 8C show examples of head-mounted displays wherein two display devices according to this preferred embodiment are disposed to serve the left and right eyes of a user. For example FIG. 8B shows an example wherein two liquid crystal panels 20, 20 are disposed inside a head-mounted display 30 both oriented in the same direction. In this case, the orientations of the pictures displayed on the liquid crystal panels 20, 20 are the same and constitute no problem. Although not illustrated in the drawings, both of the liquid crystal panels 20, 20 may alternatively be disposed so that their flexible boards 23 are on the left side in the figure.

However, due to various design restrictions such as restrictions of the space in which the liquid crystal panels 20 are to be disposed and spatial conditions for the flexible boards 23 and laying of signal lines, there are cases in which the kind of configuration shown in FIG. 8B cannot be employed. At such times, one of the liquid crystal panels may be disposed rotated through 180°, as shown in FIGS. 8A and 8C. In this case, because otherwise the pictures displayed on the liquid crystal panels 20, 20 would be seen by the user as mutually inverted in the top-bottom direction and in the left-right direction, it is necessary for the display driving direction of one of the liquid crystal panels to be inverted in the top-bottom direction and in the left-right direction. This can be done by, for one of the liquid crystal panels, reversing the shift directions of the dot scan shift registers and the line scan shift register or, when vertical-horizontal inverting the image data, controlling the read order of the memories 3a, 3b so that top-bottom and left-right inversion are also carried out. By carrying out this kind of processing it is possible to execute display with the orientations of the liquid crystal panels matched even in the cases of the configurations shown in FIGS. 8A and 8C.

A head-mounted display does not necessarily need to have two display devices, one for each eye, and for example a head-mounted display having just one display device according to the preferred embodiment is also conceivable.

Also, although in this preferred embodiment the liquid crystal panel 20 was made a transmitting RGB trio liquid crystal panel, a construction using a reflecting RGB trio liquid crystal panel is also conceivable. In this case, instead of the white back light 11 disposed behind the liquid crystal panel 20, a white front light disposed in front of the liquid crystal panel 20 would be provided. The construction of the rest of the circuitry and the operation of the display device would be the same.

A display device of a second preferred embodiment of the invention will now be described with reference to FIG. 9 through FIG. 14. Whereas in the first preferred embodiment a transmitting (or reflecting) RGB trio liquid crystal panel was used as the liquid crystal panel 20 and a white back light (or a white front light) was used, this second preferred embodiment is an example wherein a transmitting (or reflecting) monochrome liquid crystal panel 60 and an RGB color back light (or an RGB color front light) are used.

FIG. 9 is a block diagram of the display device of this preferred embodiment. Signals of the three primary colors R, G and B (an R signal, a G signal and a B signal) are supplied to this device as video signals, and these R, G and B signals are each converted into digital data by an A/D convertor 41. In this preferred embodiment also, the liquid crystal panel 60 (a transmitting monochrome liquid crystal panel) for executing display executes image display of one frame by pixel groups each forming one line in the vertical direction being successively scanned in the horizontal direction. To this end, switches 42, 44, memories 43a, 43b and a memory controller 49 function as a circuit part for vertical-horizontal inverting the video signals to adapt them to the horizontal scanning of the liquid crystal panel 60 of this preferred embodiment.

Since to effect this vertical-horizontal conversion the memories 43a, 43b are alternately written to and read from in one field units in the same way as that described in the first preferred embodiment, and specifically the memory controller 49 controls the switches and memories with the timing shown in FIGS. 4A through 4D, these processes will not be described again here. However, in this preferred embodiment, to carry out color display using the transmitting monochrome liquid crystal panel 60 and an RGB color back light 51, the vertical-horizontal inverted video signals (an R signal, a G signal and a B signal) are color-sequentially outputted at triple speed. This point will now be explained with reference to FIGS. 10A through 10D.

FIGS. 10A, 10B and 10C show R, G and B signals outputted from the convertor 41 to be inputted into one of the memories 43a, 43b. As described above in detail with reference to FIGS. 4A through 4D, image data written in a certain field period is read out and supplied to circuit parts from a γ correction circuit 45 onward in the next field period; however, in this preferred embodiment, the R, G and B signals shown in the field period on the left side in FIGS. 10A, 10B and 10C (written in one of the memories 43a, 43b) are read out as shown in FIG. 10D. That is, in the first ⅓ period of the field one field of R signal is read at triple speed, in the following ⅓ period of the field one field of G signal is read at triple speed, and in the final ⅓ period of the field one field of B signal is read at triple speed. This ⅓ period triple speed reading is carried out in the address direction illustrated in FIG. 5B, and consequently the triple speed color-sequential signal of FIG. 10D is a vertical-horizontal converted signal.

To output this triple speed color-sequential signal, in addition to control of the kind described above with reference to FIG. 4 and FIG. 5, the memory controller 49 carries out control to sequentially read out the R, G and B signals at triple speed with a timing of ⅓ of the period of one field. The R, G and B signals are severally read out to three terminals ta and three terminals tb of the switch 44, and the memory controller 49 carries out control to switch between the terminals ta and the terminals tb every one field and also switch a switch 44a between an R terminal, a G terminal and a B terminal every ⅓ field. Timing for this triple speed color-sequential signal readout is generated from a vertical synchronizing signal VD and a horizontal synchronizing signal HD and supplied to the memory controller 49 by a video signal time compression control part 53.

The R, G and B signals thus vertical-horizontal converted and made into a triple speed color-sequential signal undergo γ correction processing in the γ correction circuit 45 according to the V-T characteristic of the liquid crystal panel 60. The γ-corrected triple speed color-sequential signal is then converted back into an analog signal by a D/A convertor 46.

The triple speed color-sequential signal outputted from the D/A convertor 46 is converted in a field inverting circuit 47 into a video signal having had its polarity inverted every ⅓ field period. FIG. 11A shows R, G and B signals having been made into a triple speed color-sequential signal outputted from the D/A convertor 6, and for example this triple speed color-sequential signal is outputted with its polarity inverted every ⅓ field, i.e. every one field of individual R, G or B data as shown in FIG. 11B. Timing of every ⅓ field is provided by a liquid crystal panel driving circuit part 50. The liquid crystal panel driving circuit part 50 generates this timing of every ⅓ field for polarity inversion in accordance with timing from the memory controller 49 synchronized with the triple speed color-sequential signal and also generates and supplies to the liquid crystal panel 60 a signal for horizontal scanning.

The triple speed color-sequential signal outputted from the field inverting circuit 47 is supplied through a buffer 48 to the liquid crystal panel 60. The liquid crystal panel 60 is a transmitting monochrome liquid crystal panel, and has a display region 61 (panel part) and a display driving circuit 62 for driving pixels in the display region 61. Also, an RGB color back light 51 is disposed behind the display region 61 for transmitting display operation.

If the liquid crystal panel 60 is made to have the same number of video pixels as the liquid crystal panel 20 of FIG. 3, which is a color liquid crystal panel, because it is a monochrome liquid crystal panel, it will have ⅓ as many actual pixels. Such a reduction in the number of pixels with no loss of picture quality can be used to contribute to a reduction in the size of the liquid crystal panel 60. Or, seen another way, if the liquid crystal panel 60 is given the same actual pixel makeup as the liquid crystal panel 20, a tripling of resolution is possible.

As the scanning for image display in this preferred embodiment, scanning of vertical lines in the horizontal direction is carried out in the same way as in the first preferred embodiment. To this end, as in the construction describe above with reference to FIGS. 7A and 7B, as the display driving circuit 62 a line scan shift register is disposed above or below the display region 61 and dot scan shift registers are disposed to the left or to the right of the display region 61. However, in this preferred embodiment, a predetermined number (×in the case of×data parallel input) of dot scan shift registers common to the signals of all three of the colors R, G and B are provided.

The display device of this preferred embodiment is the same as that of the first preferred embodiment in that a video signal vertical-horizontal converted using the memories 43a, 43b is impressed on the liquid crystal panel 60 and in this liquid crystal panel 60 dot scan shift registers are disposed in the vertical direction and carry out vertical direction pixel driving based on this video signal and a line scan shift register is disposed in the horizontal direction and is supplied with a horizontal scanning signal synchronized with the vertical-horizontal converted video signal generated by the liquid crystal panel driving circuit part 50 and scanning of vertical lines is thereby executed in the horizontal direction, and as a result of this the size of the liquid crystal panel 60 in the vertical direction can be effectively reduced. Also, because the vertical direction of the liquid crystal panel 60 corresponds to the front-rear direction of a head-mounted display 30 of the kind shown in FIGS. 8A through 8C, this is helpful in reducing the front-rear direction size of the head-mounted display 30.

Also, in this second preferred embodiment, a transmitting monochrome liquid crystal panel 60 is used, color display is carried out by color-sequential lighting of an RGB color back light 51, and as mentioned above a reduction in the number of pixels of the display or an increase in resolution can be realized easily.

Color display operation using color-sequential lighting will now be described with reference to FIG. 12 through FIG. 14.

Figure 12:
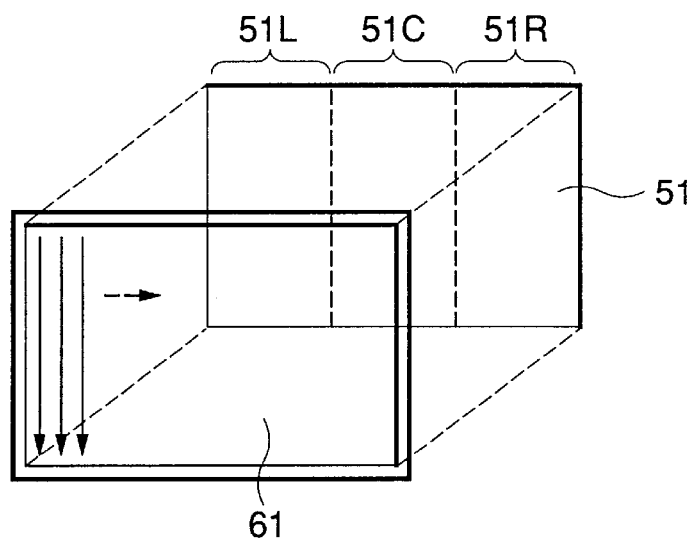
FIG. 12 is a view illustrating a liquid crystal panel and a back light of the second preferred embodiment.

As shown in FIG. 12, behind the display region 61 of the liquid crystal panel 60 there is disposed an RGB color back light 51. This RGB color back light 51 for example consists of an array of many R, G, and B light emitting diodes so that it can output red, green and blue back light. Also, in this preferred embodiment, the RGB color back light 51 is divided into a left part 51L, a middle part 51C and a right part 51R.

As can be seen from the triple speed color-sequential signal shown in FIG. 10D, in the liquid crystal panel 60 to which this triple speed color-sequential signal is supplied from the buffer 48 after undergoing various processing, in the first ⅓ period of each field, scanning (horizontal scanning of vertical lines) through one frame with an R signal is carried out, in the next ⅓ period scanning (horizontal scanning of vertical lines) through one frame with a G signal is carried out, and in the final ⅓ period scanning (horizontal scanning of vertical lines) through one frame with a B signal is carried out. In correspondence with this scanning, with the timing shown in FIG. 13, the left part 51L, the middle part 51C and the right part 51R of the RGB color back light 51 carry out a lighting operation.

This lighting operation of the left part 51L, the middle part 51C and the right part 51R is carried out on the basis of timing and lighting color command information from a back light color-sequential drive control part 52. The back light color-sequential drive control part 52 generates lighting control timing on the basis of timing synchronized with the triple speed color-sequential signal from the memory controller 49.

An example of a lighting operation will now be described specifically with reference to FIG. 13 and FIG. 14. The periods T1, T2 and T3 in FIG. 13 are periods during which scanning with an R signal is carried out in the liquid crystal panel 60, the periods T4, T5 and T6 are periods during which scanning with a G signal is carried out, and the periods T7, T8 and T9 are periods during which scanning with a B signal is carried out. As the operation of the left part 51L, the middle part 51C and the right part 51R, the low level is a non-lighting state and in the high level periods 'R' indicates red lighting operation, 'G' indicates green lighting operation and 'B' indicates blue lighting operation.

Looking first at the period T1, this period T1 is a period during which ⅓ of an R signal scan is carried out. In other words, this is a period during which scanning proceeds through the left side ⅓ of the display region 61 facing the left part 51L. In this period, scanning has not reached the parts facing the middle part 51C and the right part 51R, and the pixels of the right side ⅔ of the display region 61 still hold B signal data of the immediately preceding field. This of course is a result of a pixel transmittivity holding function in the pixels of the liquid crystal panel. Therefore, in the period T1, the state of the display region 61 is as shown in FIG. 14. In FIG. 14 the region being scanned is shown with hatching, and as shown in this figure in the period T1 the pixels of the left ⅓ of the display region 61 are being scanned and the pixels of the right ⅔ hold B signal information. Accordingly, for this period T1, as shown in FIG. 13, in the left part 51L lighting operation is stopped and in the middle part 51C and the right part 51R blue lighting operation is executed.

Figure 13:
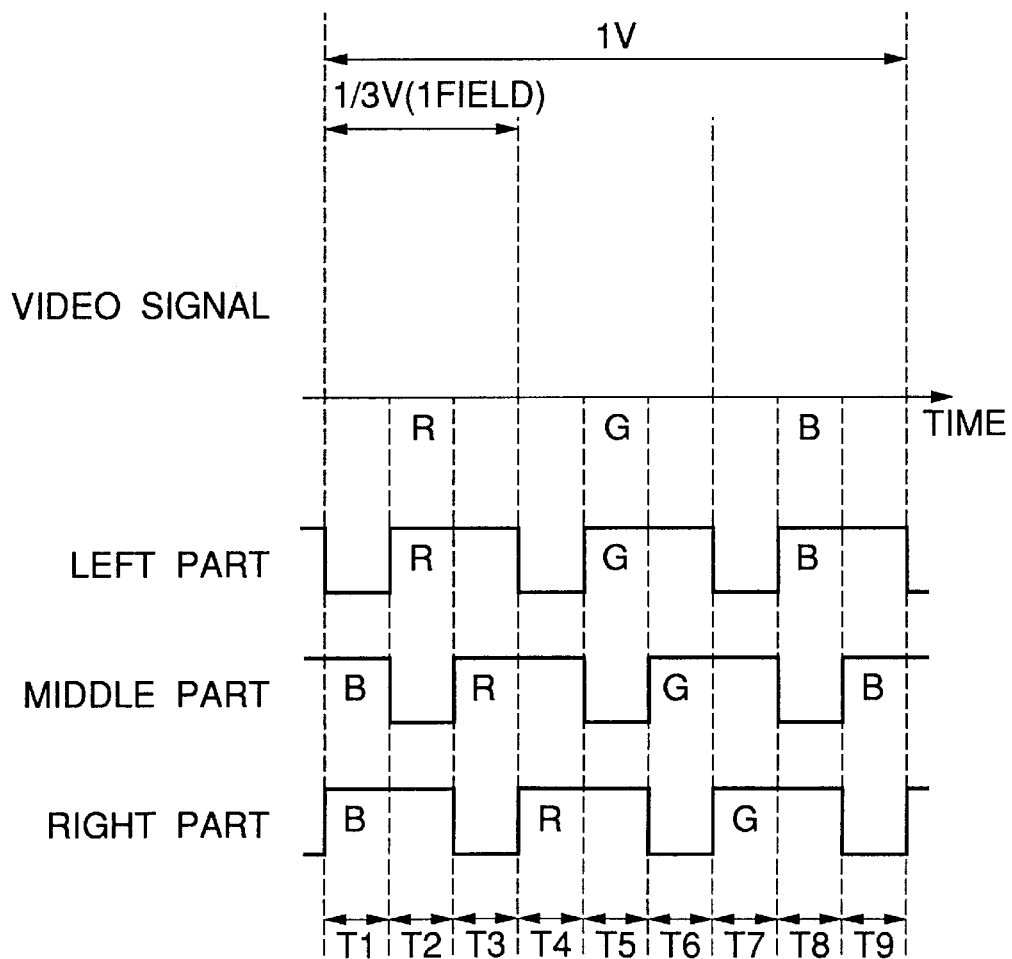
FIG. 13 is a view illustrating a lighting operation of a back light of the second preferred embodiment.
Figure 14:
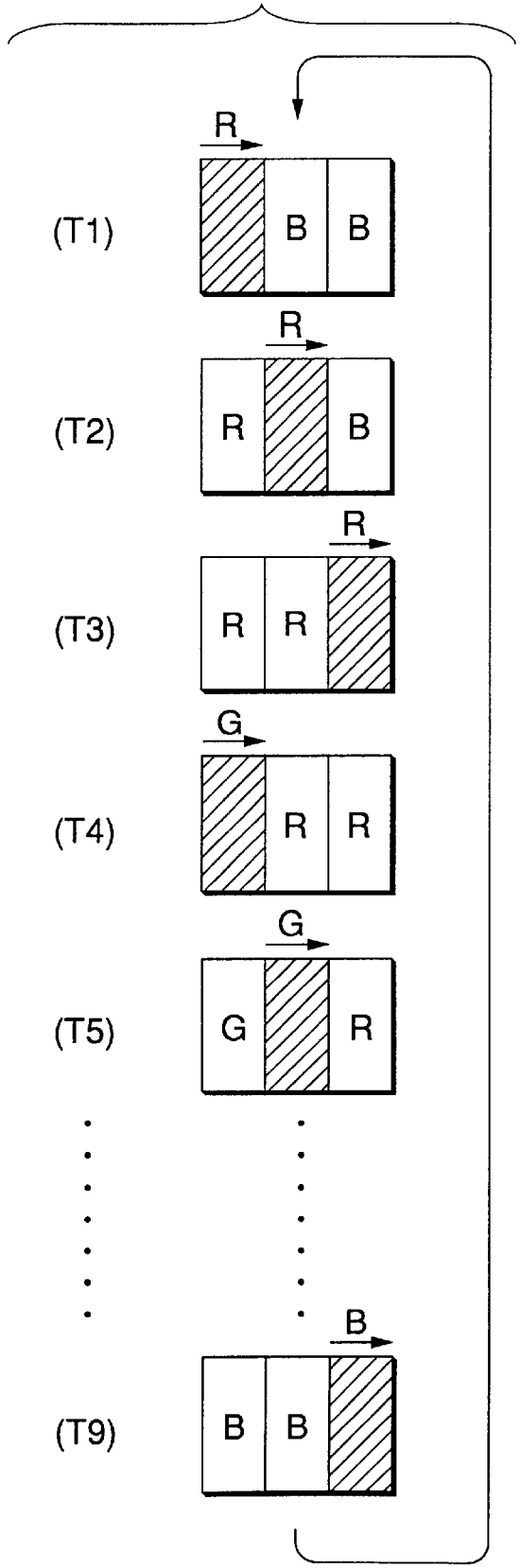
FIG. 14 is a view illustrating a relationship between a lighting operation of a back light and scanning timing in the second preferred embodiment.

Then, in the period T2, as can be seen from FIG. 14, the pixels of the left ⅓ have changed to R signal information with which they have just been scanned, the middle ⅓ is in the process of being scanned, and the pixels of the right ⅓ still hold B signal information. Accordingly, in this period T2, as shown in FIG. 13, in the left part 51L red lighting operation is executed, in the middle part 51C lighting operation is stopped, and in the right part 51R blue lighting operation is continued.

And in the period T3, as can be seen from FIG. 14, the pixels of the left ⅔ have changed to R signal information with which they have just been scanned and the pixels of the right ⅓ are in the process of being scanned. Accordingly, in this period T3, as shown in FIG. 13, in the left part 51L and the middle part 51C red lighting operation is executed and in the right part 51R lighting operation is stopped.

From the period T4, scanning with a G signal is started. As shown in FIG. 14, in the period T4 the pixels of the left ⅓ of the display region 61 are being scanned and the pixels of the right ⅔ still hold R signal information. Accordingly, for this period T4, as shown in FIG. 13, in the left part 51L lighting operation is stopped while in the middle part 51C and the right part 51R red lighting operation is executed.

In this way the states shown in FIG. 13 and FIG. 14 are executed in one field period, and by this being repeated in every field period a color video picture is displayed by scanning in the liquid crystal panel 60 based on color-sequential lighting of the RGB color back light 51 and a triple speed color-sequential signal.

In this preferred embodiment the lighting region of the RGB color back light 51 is divided into three and its lighting state is switched every ⅓ period (for example T1, T2, T3) of a scanning period constituting ⅓ of one field, but the number of divisions of the lighting region of the RGB color back light 51 can be set freely. That is, if the number of divisions of the lighting region is made 'Y' then each scanning period constituting ⅓ of one field is divided into Y periods and the lighting states of the lighting regions are switched accordingly.

Also, although in this preferred embodiment the liquid crystal panel 60 was made a transmitting monochrome liquid crystal panel, a construction using a reflecting monochrome liquid crystal panel is also conceivable; in this case, instead of the RGB color back light 51, an RGB color front light disposed in front of the liquid crystal panel 60 is provided. The construction of the rest of the circuitry and the color-sequential scanning and color-sequential lighting operations of the display device are the same.

What is claimed is:

1. A video signal display device, comprising:
   displaying means having a line scan driving circuit disposed in a horizontal direction of a display region and a pixel driving circuit disposed in a vertical direction of said display region for performing image display with pixel groups each forming one line in said vertical direction being scanned in said horizontal direction;
   vertical-horizontal converting means for converting an image data stream supplied with pixels arranged in groups of horizontal rows into an image data stream with pixels arranged in groups of vertical columns; and
   display controlling means for executing image display in said display region of said displaying means by carrying out predetermined processing on said pixel driving circuit and supplying to said pixel driving circuit image data outputted from said vertical-horizontal converting means and supplying a horizontal direction scanning signal synchronized with said image data outputted from said vertical-horizontal converting means to said line scan driving circuit.

2. The video signal display device according to claim 1, wherein said displaying means is a transmitting color liquid crystal display panel and further comprising a white back light for display operation of said transmitting color liquid crystal display panel.

3. The video signal display device according to claim 1, wherein said displaying means is a reflecting color liquid crystal display panel and further comprising a white front light for display operation of said reflecting color liquid crystal display panel.

4. The video signal display device according to claim 1, wherein said image data stream is an RGB color image data stream and said vertical-horizontal converting means outputs said RGB color image data streams color-sequentially using time division.

5. The video signal display device according to claim 4, wherein said displaying means is a transmitting monochrome liquid crystal panel and there is provided an RGB color back light for display operation of said transmitting monochrome liquid crystal panel and said RGB color back light carries out a lighting operation RGB color-sequentially in correspondence with said RGB image data streams color-sequentially outputted from said vertical-horizontal converting means.

6. The video signal display device according to claim 4, wherein said displaying means is a reflecting monochrome liquid crystal panel and further comprising an RGB color front light for display operation of said reflecting monochrome liquid crystal panel and said RGB color front light carries out a lighting operation RGB color-sequentially in correspondence with said RGB image data streams color-sequentially outputted from said vertical-horizontal converting means.

7. The video signal display device according to claim 1, wherein two units of said displaying means are disposed left-right symmetrically and said display controlling means supplies image data and scanning signals in such a way that said two units of said displaying means display the same image while mutually inverted in a top-bottom direction and in a left-right direction.

8. A video image signal displaying method, comprising:
   a displaying step of providing a line scan driving circuit in a horizontal direction of a display region and providing a pixel driving circuit in a vertical direction of said display region so that image display can be carried out by pixel groups each forming one line in said vertical direction being scanned in said horizontal direction;
   a vertical-horizontal converting step of converting an image data stream supplied with pixels arranged in groups of horizontal rows into an image data stream with pixels arranged in groups of vertical columns; and
   a display controlling step of executing image display in said display region of said displaying step by carrying out predetermined processing on said pixel driving circuit and supplying to said pixel driving circuit image data outputted from said vertical-horizontal converting step and supplying a horizontal direction scanning signal synchronized with said image data outputted from said vertical-horizontal converting step to said line scan driving circuit.

9. The video image signal displaying method according to claim 8, wherein said displaying step is carried out using a transmitting color liquid crystal display panel and a white back light for display operation of said transmitting color liquid crystal display panel.

10. The video image signal displaying method according to claim 8, wherein said displaying step is carried out using a reflecting color liquid crystal display panel and a white front light for display operation of said reflecting color liquid crystal display panel.

11. The video image signal displaying method according to claim 8, wherein said image data stream is an RGB color image data stream and said vertical-horizontal converting step comprises outputting said R, G and B color image data streams color-sequentially using time division.

12. The video image signal displaying method according to claim 11, wherein said displaying step is carried out using a transmitting monochrome liquid crystal panel and an RGB color back light for display operation of said transmitting monochrome liquid crystal panel and said RGB color back light carries out a lighting operation RGB color-sequentially in correspondence with said RGB image data streams color-sequentially outputted in said vertical-horizontal converting step.

13. The video image signal displaying method according to claim 11, wherein said displaying step is carried out using a reflecting monochrome liquid crystal panel and an RGB color front light for display operation of said reflecting monochrome liquid crystal panel and said RGB color front light carries out a lighting operation RGB color-sequentially in correspondence with said RGB image data streams color-sequentially outputted in said vertical-horizontal converting step.

14. The video image signal displaying method according to claim 8, wherein said displaying step comprises disposing two units of displaying means, each unit having said line scan driving circuit disposed in a horizontal direction of said display region and said pixel driving circuit disposed in a vertical direction of said display region for performing image display with said pixel groups each forming one line in said vertical direction being scanned in said horizontal direction, left-right symmetrically and said display controlling step comprises supplying image data and scanning signals so that said two units of displaying means display the same image while mutually inverted in a top-bottom direction and in a left-right direction.

* * * * *